US006997666B1

(12) United States Patent
Rodgers et al.

(10) Patent No.: US 6,997,666 B1
(45) Date of Patent: Feb. 14, 2006

(54) AUTOMATED CART UNLOADING/CONVEYOR SYSTEM

(75) Inventors: Lowell Thomas Rodgers, Danville, KY (US); Christopher Wayne Swafford, Danville, KY (US)

(73) Assignee: American Greetings Corporation, Cleveland, OH (US)

( * ) Notice: Subject to any disclaimer, the term of this patent is extended or adjusted under 35 U.S.C. 154(b) by 140 days.

(21) Appl. No.: 10/061,115

(22) Filed: Feb. 1, 2002

(51) Int. Cl.
*B65G 47/74* (2006.01)

(52) U.S. Cl. ................. 414/331.06; 195/599; 195/637; 414/337

(58) Field of Classification Search ................ 414/395, 414/331.6, 331.7, 337, 265; 198/435, 599, 198/637
See application file for complete search history.

(56) References Cited

U.S. PATENT DOCUMENTS 677,423 A * 7/1901 Own .......................... 414/265
718,745 A * 1/1903 Winant .................... 414/142.1
921,504 A * 5/1909 Been .......................... 414/265
1,526,724 A * 2/1925 Thompson ............... 198/475.1
2,493,807 A * 1/1950 Frederick ................. 198/465.1
2,854,126 A * 9/1958 Rosenberger, Jr. .......... 198/367
2,872,058 A 2/1959 Doepke et al.
2,913,108 A * 11/1959 Amori ........................ 209/659
2,992,721 A * 7/1961 Eger .......................... 198/427
3,656,636 A * 4/1972 Konstantin ............. 198/370.03
3,759,381 A * 9/1973 Mercadie et al. ........... 209/559
3,848,728 A * 11/1974 Leibrick et al. ............ 198/155
4,005,787 A * 2/1977 Sleep .......................... 214/58
4,128,163 A * 12/1978 Rana et al. ................. 198/796
4,144,960 A 3/1979 Scourtes
4,399,904 A * 8/1983 Canziani ................ 198/370.04
4,674,940 A 6/1987 Uchida et al.
4,730,973 A 3/1988 Sokolovsky et al.
4,911,281 A * 3/1990 Jenkner ...................... 198/364
5,070,987 A 12/1991 Koltookian
5,307,921 A * 5/1994 Richardson ................. 198/365
5,372,319 A 12/1994 Dolgas
5,551,821 A 9/1996 Hall
5,570,773 A * 11/1996 Bonnet .................. 198/370.04
5,582,284 A 12/1996 Calladine et al.
5,967,288 A 10/1999 Faraoni et al.
6,019,211 A 2/2000 Masciarelli, Jr.
6,202,824 B1 3/2001 Goss et al.
6,224,363 B1 5/2001 Mahan et al.
6,298,975 B1 * 10/2001 Fortenbery et al. .... 198/370.03
6,585,101 B2 * 7/2003 Edwards et al. ....... 198/370.06

* cited by examiner

*Primary Examiner*—Thomas J. Brahan
(74) *Attorney, Agent, or Firm*—Roetzel & Andress

(57) ABSTRACT

An automated cart unloading/conveyor system for automated unloading of articles from a transport vehicle or cart to one or more transfer surfaces, conveyors, or other platforms. A specially configured cart carries articles to be transferred upon shelves. The cart is engaged by a cart drive mechanism which propels the cart along a path which interfaces with one or more diverter arms configured to interface with the cart to transfer articles from the cart onto one or more conveyors. In one embodiment, the cart may have multiple shelves which interface with multiple conveyors along the cart drive path, and further each shelf of the cart may be divided with a diverter arm positioned to interface with each divided portion of each shelf of the cart.

4 Claims, 5 Drawing Sheets

AUTOMATED CART UNLOADING/CONVEYOR SYSTEM

FIELD OF THE INVENTION

The present invention pertains generally to a system for the automated transfer of merchandise from one vehicle to another and, more particularly, to a material handling system which automatically transfers merchandise from a cart to one or more conveyors.

BACKGROUND OF THE INVENTION

In typical material handling and warehouse management systems, containers of merchandise are manually loaded onto a filling cart or other similar device and then manually unloaded from the cart to a conveyor. The filling cart is then reloaded and the process repeated. This system of manually unloading the filling carts required the use of an operator. The operator would have to manually push the cart full of merchandise containers to the conveyor system, unload each article from the cart and place it on the conveyors, and then return the cart to the loading station. This use of an operator to manually unload the merchandise containers increases labor costs and decreases overall production efficiency.

Also, these types of systems can lead to worker stress and injuries. Laborers are required to push a cart filled with heavy merchandise containers, and lift each container off of a cart and place it on a conveyor. It is also anticipated that these injuries would increase with increased weights and volumes of the merchandise containers.

Given the amount of manual labor still required in many material and article handling operations, systems which automate handling and transfer of items are highly desireable, resulting in decreased worker stress and injuries, labor costs, and increased efficiencies.

SUMMARY OF THE INVENTION

The present invention provides an improved material handling system which automates transfer of items from one conveyance to another. Merchandise containers are automatically removed from a propelled cart to one or more conveyors, thereby eliminating the need for manual transfer of articles or containers transported by the cart.

The automated cart unloading/conveyor system of the present invention includes a specially configured cart, a cart drive mechanism, and one or more diverter arms which interface with the cart to unload articles from the cart onto one or more conveyors. In one embodiment, there are one or more conveyors on each side of the cart path. The conveyors are supported by a metal tubing frame. Diverter arms extend from the conveyors into the cart path. The diverter arms are positioned directly above each conveyor to interface with the cart to unload articles from the cart onto the conveyors. The cart includes one or more shelves, such as for example a top shelf and bottom shelf. The shelves are supported along a central axis of the cart and cantilevered to extend laterally outward to interface with the diverter arms. The cart further includes a guide fin positioned on top of and extending along a central axis of the cart. This guide fin is engaged by a cart drive mechanism which has pairs of drive wheels supported by a framework located next to or between the conveyors. The guide fin is engaged by the rotating drive wheels which thereby advance the cart through the linear extent of the drive mechanism, past the diverter arms and the conveyors.

Boxes or articles on the shelves of the cart are contacted by the diverter arms which are angled to extend from the longitudinal axis of the cart to the corresponding conveyor. The box or article follows along the angle of the diverter arm to be automatically transferred from the cart to the conveyor, thereby automatically unloading the cart.

In another embodiment of the invention, there is at least one conveyor belt and diverter arm. The cart includes at least one shelf which interfaces with the diverter arm which extends above the conveyor. A cart drive mechanism advances the cart through a cart unloading station at which one or more diverter arms are located. A diverter arm contacts articles on the cart and guides them onto the conveyor.

These and other aspects of the invention are herein described with reference to the accompanying Figures which are representative of just a few of the ways in which the principles and concepts of the invention can be embodied.

DETAILED DESCRIPTION OF THE INVENTION

The invention provides a material handling system for automatically unloading articles from a conveyance, such as a transport vehicle or cart, onto a transfer surface such as a table, work station, or conveyor. The present invention automatically propels an article-carrying cart (alternatively referred to as a "transport vehicle") past a transfer surface or conveyor, and a diverter arm which interfaces with the cart and transfer surface to transfer articles from the cart onto the transfer surface. Although described in connection with one or more conveyors as the transfer surfaces (which is a more extensive system for automated article handling) it is understood that references to conveyors alternatively include other types of transfer surfaces such as work station tables, intermediate processing points, or other automated stations which perform other operations on transferred articles or objects.

Figure 1:
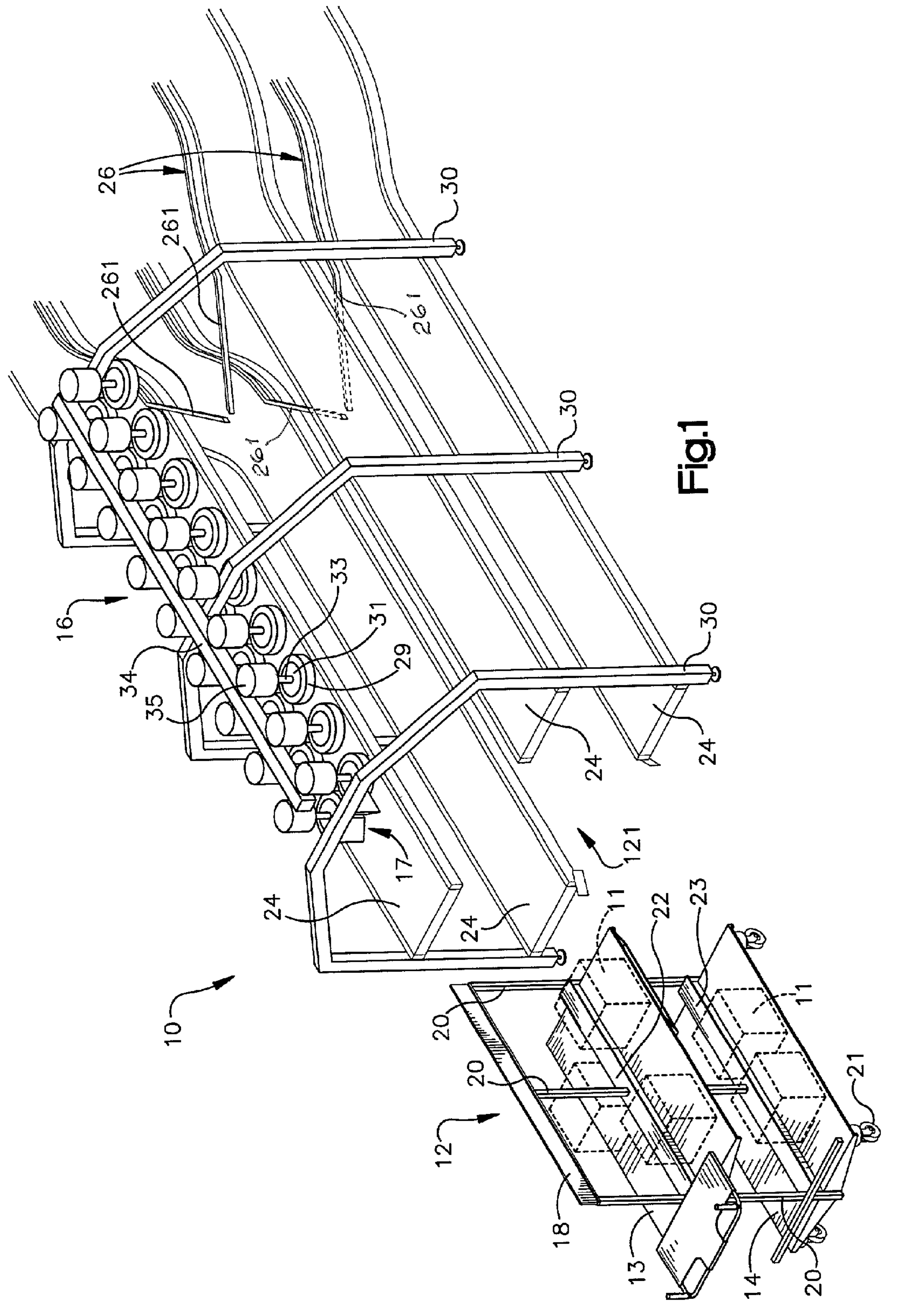
FIG. 1 is a perspective view of an automated cart unloading/conveyor system of the present invention.

FIG. 1 illustrates one embodiment of an automated cart unloading/conveyor system 10 of the present invention. The system 10 includes a specially configured transport vehicle or cart 12 with one or more shelves, e.g. 13, 14, a cart drive mechanism indicated generally at 16, and one or more diverter arms 26 which interface with the cart 12 and its path of travel to unload articles 11 from the cart shelves 13, 14 onto one or more transfer surfaces, which may be in the form of conveyors 24 positioned laterally to the cart when the cart is engaged with the cart drive mechanism.

Figure 2:
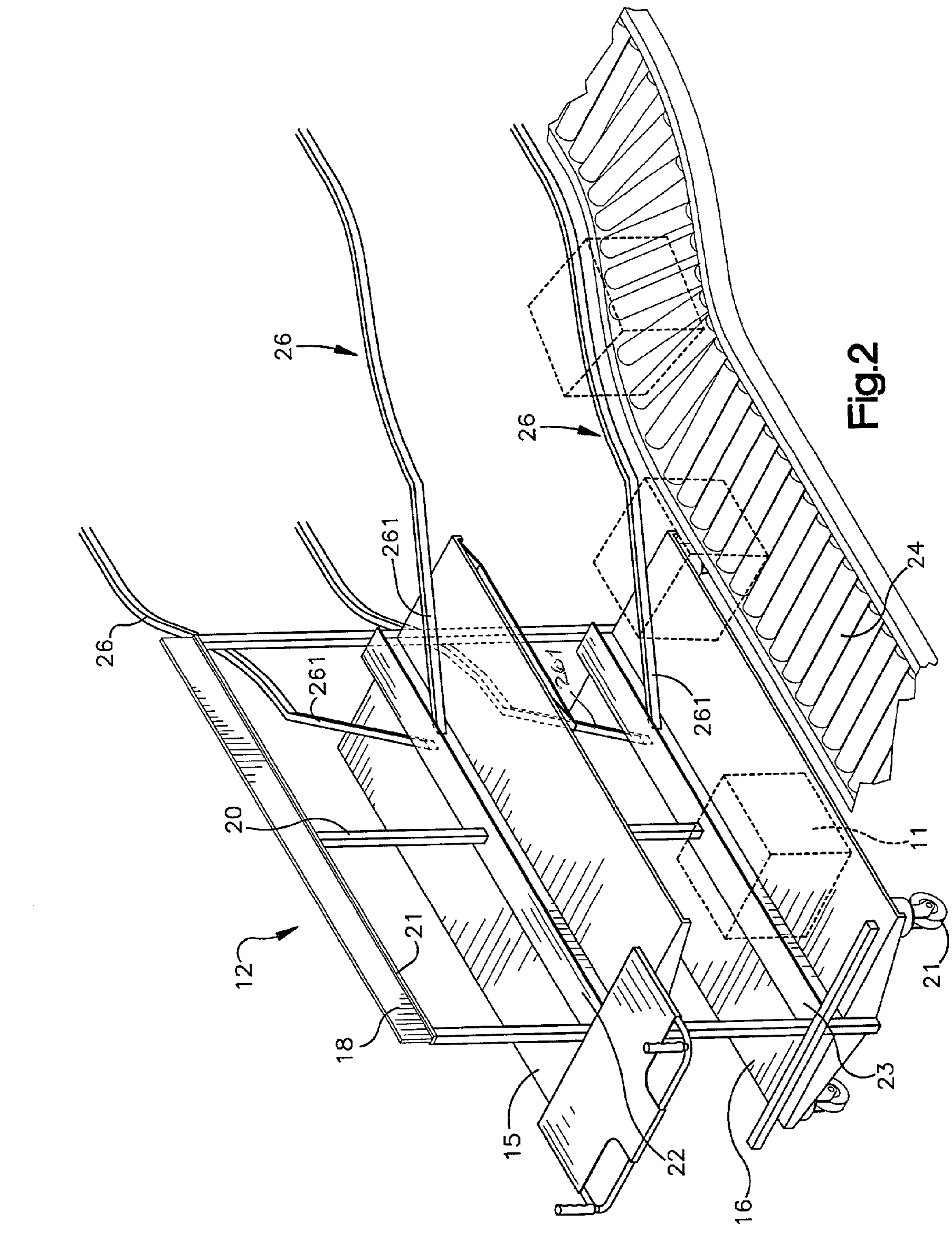
FIG. 2 is a perspective view of diverter arms of the automated cart unloading/conveyor system.

The cart drive mechanism 16 engages the cart as further described to advance the cart 12 along a path (the "driven cart path" indicated generally at 121) past the diverter arm(s) 26 and past the laterally disposed segments of transfer surfaces/conveyors 24. Distal ends 261 of the diverter arms 26 extend over the shelves 13,14 of the cart 12, as shown in FIG. 2. The distal ends 261 of the diverter arms 26 extend across or over the shelves 13, 14 to come into angular contact with articles 11 on the shelves. The articles 11 are thereby diverted or transferred from the shelves 13, 14 onto the respective conveyor 24 for subsequent transfer by the conveyor. The conveyor 24 then transports the transferred articles 11 along the conveyor route. If the transfer surface is a table or work station rather than a conveyor, then the article is transferred to such surface for subsequent handling at that point. Although depicted generally as rectangular objects, it is to be appreciated that the articles 11 may be in virtually any form or size capable of being transported by the cart and transferred in the described manner. This may include, for example, unpackaged parts in a manufacturing or subassembly operation, where parts articles are automatically transferred to a station for sequential processing. The system is applicable to the automated handling of any articles or objects capable of being so transported and transferred.

In the illustrated embodiment, there are four conveyors 24. However, the invention is applicable to any conveyor set-up or arrangement, with any number of conveyors in any arrangement. In the illustrated embodiment, upper and lower conveyors 24 are located on each side of the cart path, indicated generally at 121. The conveyors 24 are located at elevations which correspond with the height of shelves 13,14. The diverter arms 26 are supported in the horizontal and angularly disposed positions by suitable framework, fixtures or stands (not shown) arranged about the cart path and conveyors. In a preferred arrangement, the distal ends 261 of the diverter arms 26 extend into the driven cart path and over the cart shelves, and a downstream portion of the arm is positioned at an edge of the corresponding conveyor to serve as a bumper or guard rail, keeping articles which have been transferred from the cart on the conveyor or transfer surface.

Figure 4:
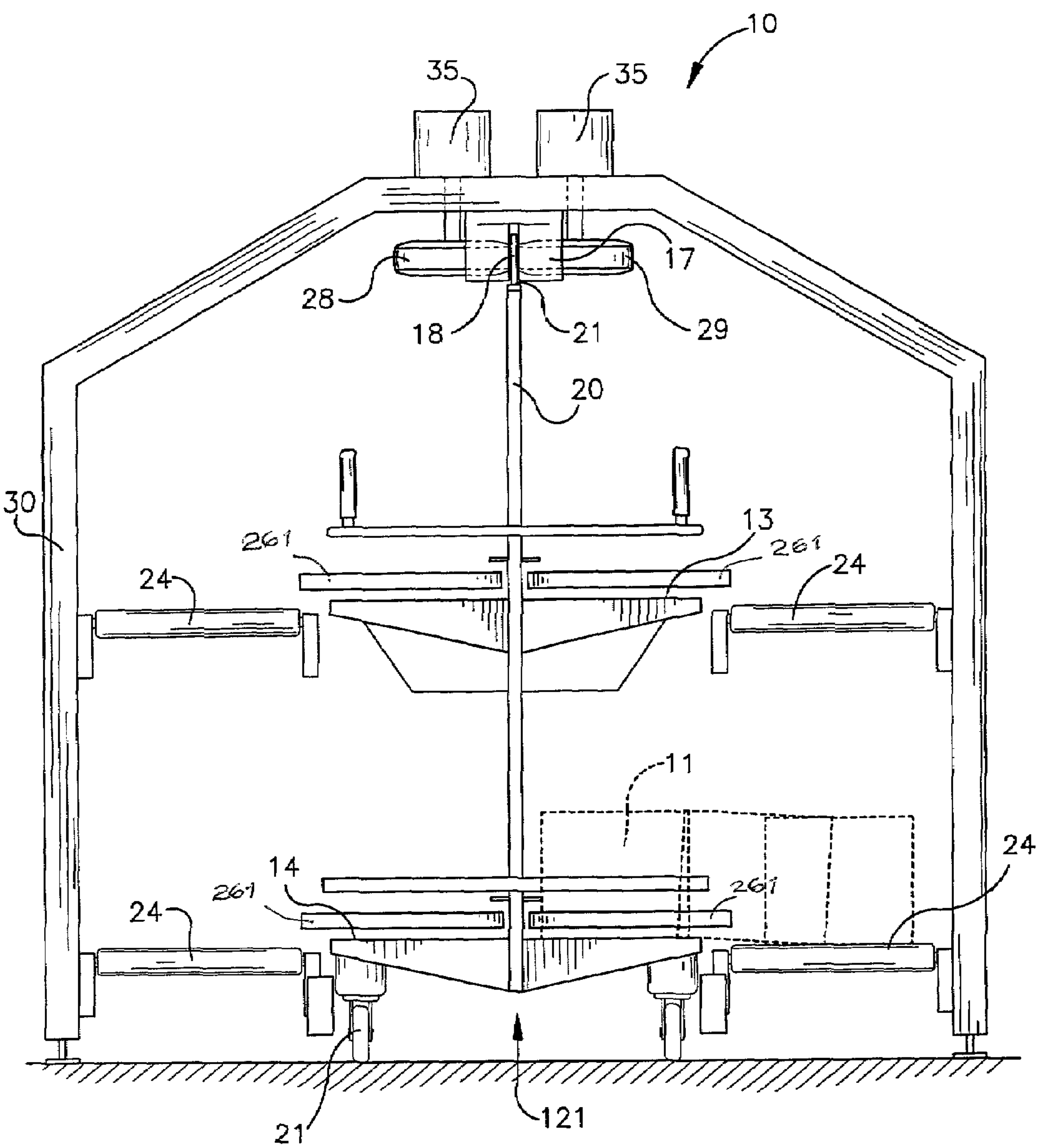
FIG. 4 is an end view of the automated cart unloading/conveyor system.

In the embodiment shown in FIGS. 1 and 4, a framework 30 includes risers positioned laterally outboard of conveyors 24. The diverter arms 26 may be secured or otherwise attached or in contact with the framework 30 to form a rigid structure capable of performing the described diverter function even with relatively heavy articles to be transferred. The conveyors 24 may also be attached at one or more points to framework 30 to form a structurally integrated cart unloading system. Other structural arrangements which support the diverter arms in relation to the conveyor(s) or transfer surface(s) can be suitably employed in accordance with the principles of the invention.

Figure 6:
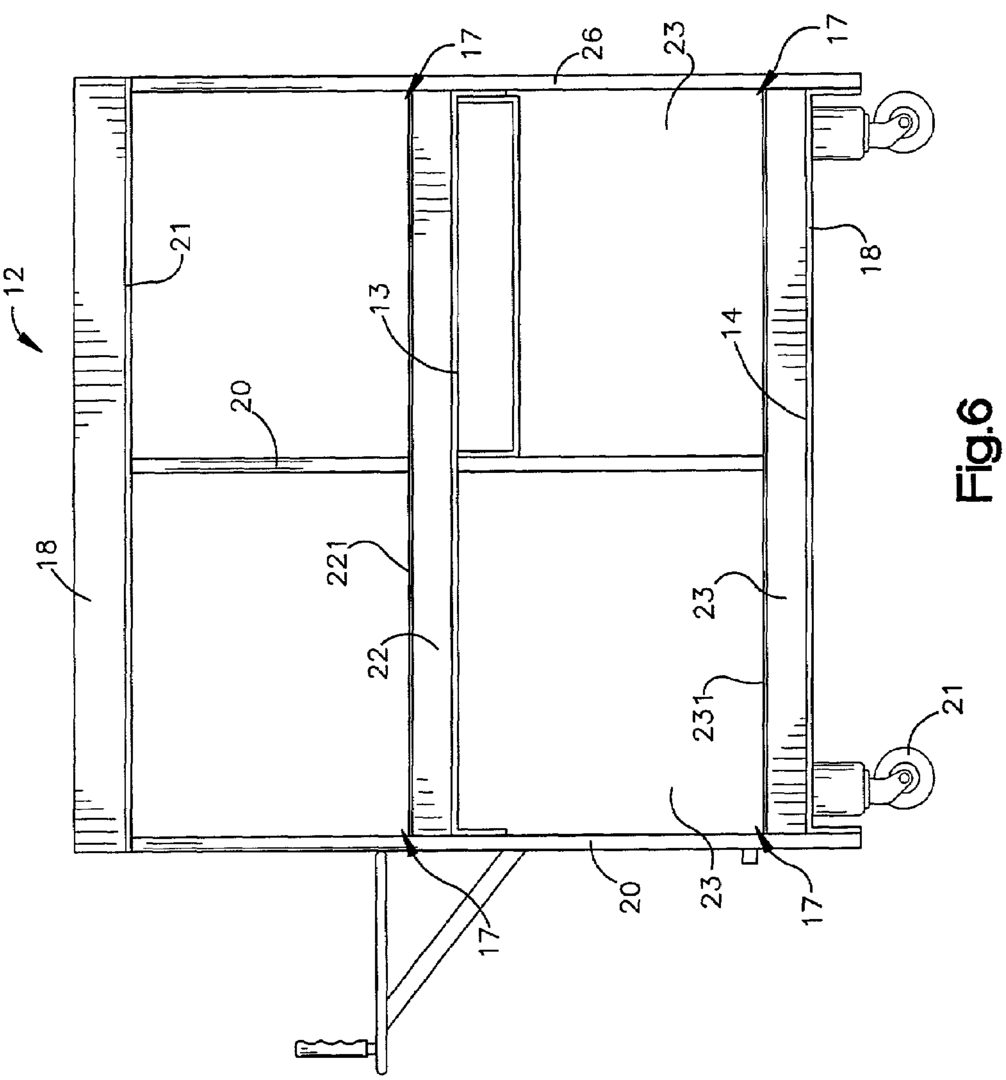
FIG. 6 is a side elevation view of the cart of FIG. 5.
Figure 5:
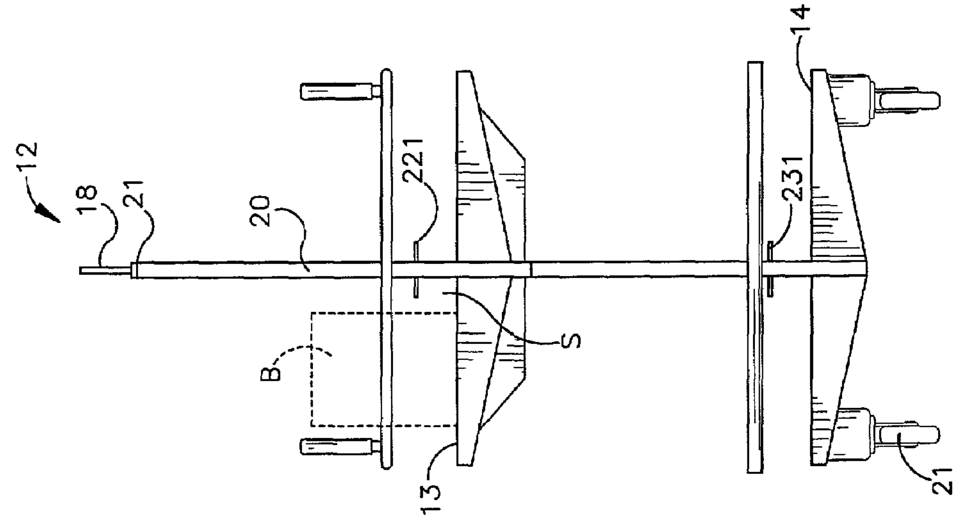
FIG. 5 is an end elevation view of a cart of the automated cart unloading/conveyor system.

One type of cart or mobile article transporter which can be used in accordance with the invention is now described in operative combination with one type of cart drive mechanism. The physical embodiments of these components of the automated system are representative of just one way in which the operation, function and result of the system can be performed. FIGS. 5 and 6 illustrate one embodiment of the cart 12, which includes a top shelf 13 and bottom shelf 14, which as described are approximately at the same elevation as the corresponding conveyors 24. Vertical members 20 are centrally located along a longitudinal axis of the cart, dividing shelves 13 and 14 as shown in FIG. 5. The vertical members 20, located at each end 17, and at the middle 13 of the cart, extend from a bottom frame piece 18 to a top frame piece 21. Divider panels 22 and 23 are positioned between the vertical members to provide a wall between the divided halves of shelves 15, 16. The dividers 22 and 23 are placed perpendicular with the shelves 13 and 14. The dividers 22 and 23 partition the shelves 13, 14, so that articles 11 located on one half of shelf 15 or 16 will not come in contact with an article 11 located on the other half of shelf 13 or 14. Horizontal flanges 221, 231 are provided at the top of dividers 22, 23 so that articles on the shelves, such as box B, are contacted only by the outboard edge of the flanges, as shown in FIG. 5. The spaces S between the flanges 221, 231 and the respective shelves 15, 16 are for passage of the tip of distal end 261 of the diverter arms 26, as further described.

Figure 3:
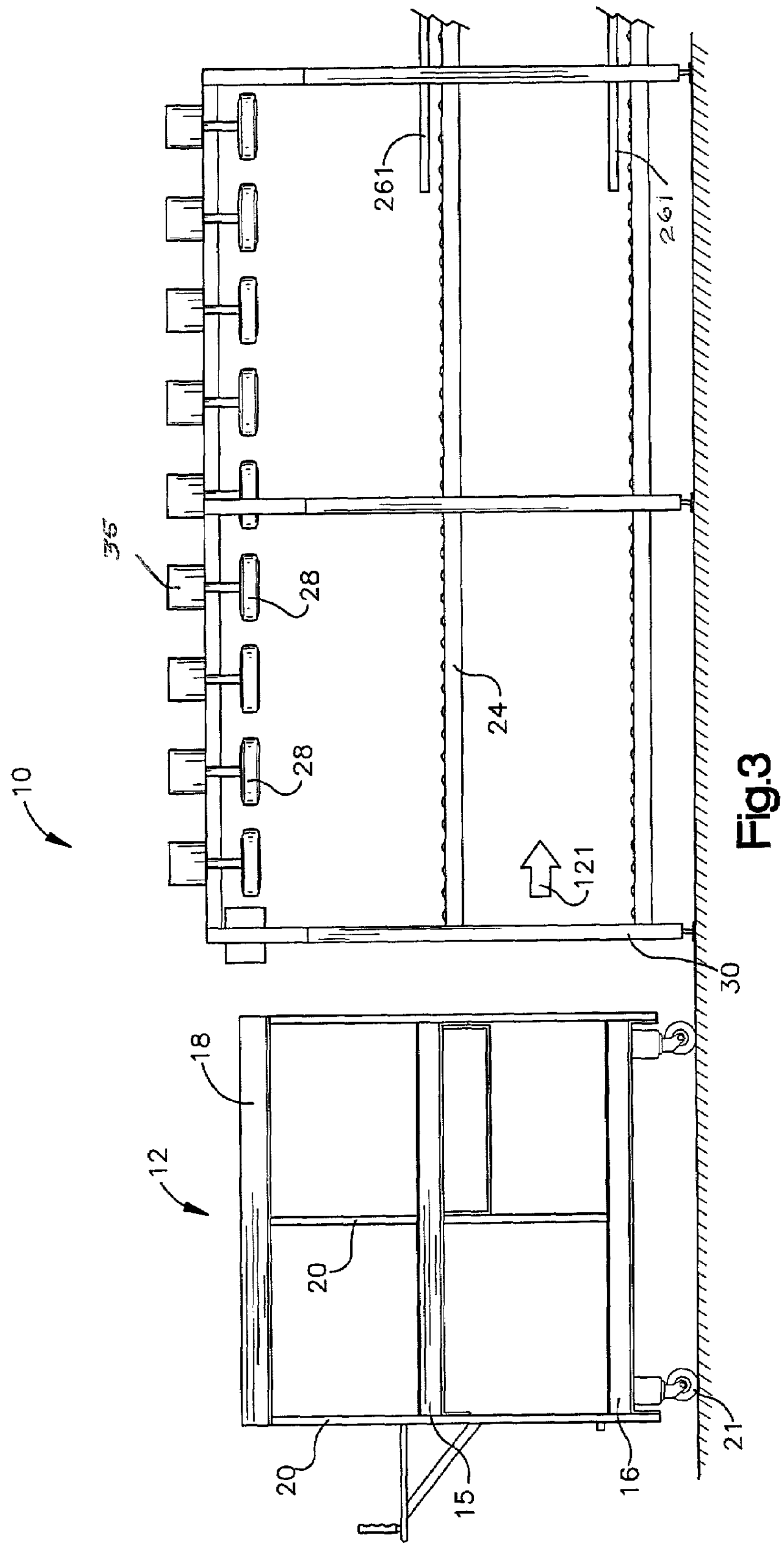
FIG. 3 is an elevation view of the automated cart unloading/conveyor system.

As shown in FIGS. 1, 3 and 4, one type of cart drive mechanism 16 (alternatively referred to as a "transport vehicle propulsion system") has a series of opposing pairs of drive wheels 28 positioned to engage in rolling contact with a vertical fin 18 which extends vertically from the top frame member 21 of cart 12. The drive wheels 28 are, for example, rubber tires 29 mounted on hubs 31, connected to axles 33 which extend downward from respective drive motors 35, which are mounted to member 34 of frame 30. The opposed pairs of drive wheels are geared to rotate at a common speed in opposite directions, to grip and advance the flange 18 of cart 12, advancing it through the series of drive wheels. A tapered guide chute 17 is located at the cart entry end of the drive wheel array to direct the vertical fin 18 into engagement with the first set of drive wheels. Once gripped and advanced in this manner, the cart, being mounted on swivel-type casters 21 is brought into alignment with the drive line, and is advanced automatically by sequential engagement with the subsequent sets of wheels. The path the cart follows, as defined by the alignment of the wheel pairs, is also referred to as the "driven cart path". The entire length of fin 18 (and cart 12) is advanced through the forwardmost set of drive wheels and past the distal ends of the diverter arms so that all articles on the shelves of the cart are diverted onto the conveyor(s).

In other embodiments, there are many equivalent alternatives to the cart drive mechanism. For example, the cart drive mechanism may be positioned on the floor or otherwise underneath the lowermost shelf of the cart. Thus, the drive wheels 28 would be located on the floor between the two conveyors 24 and the fin or guide rail 18 of the cart 12 would be positioned on the underside of the bottom shelf 14. The fin or guide rail 18 would similarly engage the drive wheels 28, pulling the cart 12 past the conveyors 24, a difference being the general location of the drive mechanism. Alternatively, the drive mechanism may include a tow line or similar motion mechanism. One end of the tow line would be attached to the cart 12 and the other end of the tow line would be attached to a winch which would pull the cart past the diverter arms. These are just a few of the examples of different types of drive mechanisms which can be employed to accomplish the objectives and functions of the invention. Also, the cart conveyance may differ from the described casters, such as sled-type skids, ball transfers, wheels mounted on rails, chain drive, or on-floor or in-floor track guidance systems as known in the art.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Other features and aspects of this invention will be appreciated by those skilled in the art upon reading and comprehending this disclosure. Such features, aspects, and expected variations and modifications of the reported results and examples are clearly within the scope of the invention where the invention is limited solely by the scope of the following claims.

What is claimed is:

1. A system for automated transfer of articles from a cart to a transfer surface, the system comprising:

a cart having a shelf for carrying articles and a fin over the shelf;

a cart drive mechanism located over the cart which contacts the fin to drive the cart along a driven cart path and past a stationary diverter arm;

the diverter arm extending laterally into the driven cart path and over the shelf of the cart to contact an object on the shelf and laterally divert the object off of the shelf on to a transfer surface.

2. The system of claim 1 wherein the cart further comprises a flange which extends over a portion of the shelf, and a distal end of the diverter arm fits between the flange and the shelf as the cart passes the diverter arm.

3. A system for transfer of articles from a cart, the system comprising:

a cart having a shelf for carrying articles and a fin located over the shelf;

a cart drive mechanism located over the cart which contacts the fin to drive the cart along a cart path and past a stationary diverter arm;

the diverter arm extending laterally into the cart path and over the shelf of the cart to contact an object on the shelf and laterally divert the object off of the shelf.

4. The system of claim 3 wherein the cart further comprises a flange which extends over a portion of the shelf, and a distal end of the diverter arm fits between the flange and the shelf as the cart passes the diverter arm.

* * * * *